Sept. 25, 1945.  A. L. CHRISTIANSEN  2,385,689
BRAKE
Filed May 29, 1943
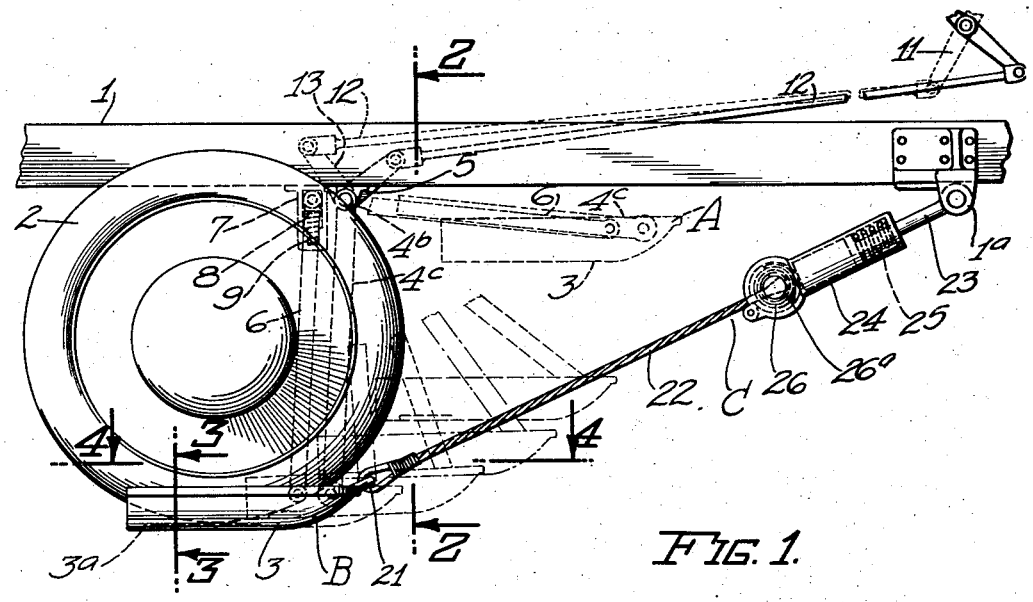
FIG. 1.
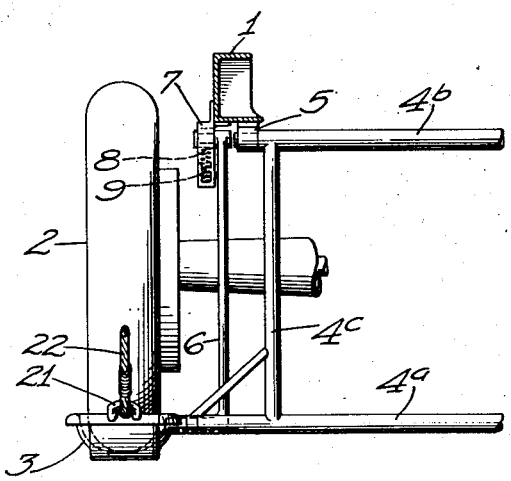
FIG. 2.
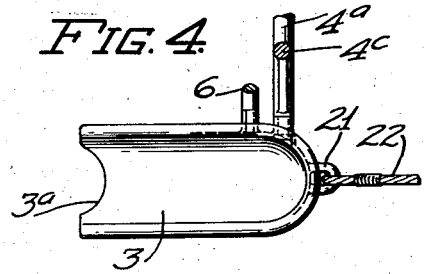
FIG. 4.
FIG. 3.
INVENTOR
ANDREW L. CHRISTIANSEN
BY William B. Hall
ATTORNEY.

Patented Sept. 25, 1945

2,385,689

UNITED STATES PATENT OFFICE 2,385,689

BRAKE

Andrew L. Christiansen, Willowbrook, Calif.

Application May 29, 1943, Serial No. 489,051

8 Claims. (Cl. 188—4)

My invention relates to an emergency vehicle brake, particularly for braking heavier vehicles, such as trucks.

One of the principal objects of this invention is to provide a brake of this class which may be readily applied when the conventional brakes of the vehicle either fail entirely to function or fail in any respect to hold the vehicle.

Another object of this invention is to provide a brake of this class which, when not in use, may be held completely out of the way, and be at all times in readiness to be applied for braking the vehicle.

A further important object of this invention is to provide novel means of transmitting the braking force directly to the frame of the vehicle, and novel means in connection therewith for holding the brake in a retracted position, and also means in connection therewith for taking up the sudden shock which may be applied thereto when the emergency brake is suddenly subjected to its braking limit.

A still further important object of this invention is to provide a brake of this class which is simple but rigid of construction.

With these and other objects in view, as will appear hereinafter, I have devised a vehicle emergency brake having certain novel features of construction, combination, and arrangement of parts and portions as will be hereinafter described, in detail and particularly set forth in the appended claims, reference being had to the accompanying drawing and the characters of reference thereon which form a part of this application, in which:

Fig. 1 is a fragmentary side elevation of the rear end of a vehicle showing my brake mechanism installed thereon and in a brake-applying position, showing by various broken, dot, and dot-dash lines the brake shoe and associated members in various extreme and intermediate positions;

Fig. 2 is a fragmentary transverse elevation thereof taken through 2—2 of Fig. 1;

Fig. 3 is a sectional view taken through 3—3 of Fig. 1, showing the cross-section of one of the brake shoes; and Fig. 4 is a sectional view in plan taken through 4—4 of Fig. 1, showing primarily the top of a brake shoe.

The frame and rear wheels of a truck or other vehicle are indicated, respectively, by 1 and 2. The brake shoes 3, there being one for each wheel, are substantially in the form of a hollow shoe or sled, and are capable of supporting the wheels 2 thereon and therein, as shown in Fig. 1. The shoes are of a width so that single or double tired wheels may extend therein or be supported upon the same shoe.

Each of the shoes is carried at the lateral sides and lower ends of a rectangular frame 4, as shown best in Fig. 2 (only one side of the frame being shown). This frame consists of a lateral $4^a$ which directly connects the shoes, a lateral $4^b$, at the upper end which pivotally supports the frame on brackets 5 depending from the vehicle frame 1, and vertical tie members $4^c$ which support the lower lateral $4^a$ from the upper lateral $4^b$.

The shoes are pivotally mounted near their forward ends on the lower lateral $4^a$. The shoes are held in substantially horizontal positions by guide rods 6. These rods are pivotally connected at their lower ends to the inner sides of the shoes and are pivotally mounted at their upper ends on brackets 7 which are positioned behind the brackets 5. However, the means providing the pivotal support of the rods 6 is vertically slidable on the brackets 7, this being accomplished by providing a shoe or floating journal 8 which is held in an upward position in the bracket 7 by a spring 9.

In the movement of the brake shoe from its out of the way position, indicated A, to its ultimate braking position, indicated by B, the shoe is depressed slightly at its rear end, by reason of its engagement with the tire of the wheel 2, as indicated by the various positions. This slightly depressed position of the rear end of the shoe is permitted by the yieldable pivotal support of the upper end of the rod 6.

In order to reduce such angular inclination or depressed position of the shoe, the rear end of the shoe may be cut out slightly as indicated by $3^a$ in Fig. 4.

Also to reduce the angular or depressed position of the brake shoes, the normal position of the shoe in the braking position is such that the vertical supports $4^c$ of the frame 4 and the rods 6 are inclined slightly backwardly from their normal vertical positions, as shown in Fig. 1.

The brake shoe may be shifted from the A to the B position by any suitable means, such as a control lever 11 on the vehicle frame, and accessible by the driver of the vehicle. This lever may be connected by a rod 12 to an arm 13 connected to the upper portion of the frame 4, above the pivotal mounting thereof.

In order to carry the braking effect of the shoes 3, each of the latter are connected by a tension means C to the frame 1 of the vehicle ahead of the braking wheels. This means C may be variously constructed. As shown, it consists of a draft member 21 in the form of a loop at the front end of each shoe, a chain or cable 22 extending from the draft member 21, a tension member 23, a tension cylinder 24, and a spring 25, the one end of the tension member 23 being connected to a bracket $1^a$, one being provided at each side of the frame. The tension member 23 extends into the cylinder 24 and is forced therein by the compression spring 25 when the shoe is not in a braking position. The outer or free end of the cylinder is provided with a drum 26 upon which the upper end of the chain or cable 22 is adapted to be wound when the braking device is in a retracted position, indicated by A. The winding drum 26 is enclosed in an enclosure 26ª which may form part of the cylinder 24. The drum 26 is adapted automatically to wind the chain or cable 22 thereon when the shoe is retracted, the means for automatically winding the cable on the drum being of common knowledge and is not here shown. Both the spring actuated drum and the spring 25 tend to draw the shoes in their retracted position A while the spring 25 provides the only means for taking up the shock when the brake is applied.

Though I have shown and described a particular construction, combination, and arrangement of parts and portions, I do not wish to be limited to the same, but desire to include in the scope of my invention the construction, combination, and arrangement substantially as set forth in the appended claims.

I claim:

1. In a vehicle brake mechanism of the class described, a vehicle frame having supporting wheels, brake shoes upon which said wheels are adapted to ride, parallel bars normally supporting said shoes in horizontal positions from said vehicle frame in front of the wheels, said parallel bars being positioned one behind the other and one of the bars being mounted upon a yieldably slidable pivot, means for shifting said shoes from said normal positions to positions under the wheels, and tension means connecting the forward ends of the shoes to the frame.

2. In a vehicle brake mechanism of the class described, a vehicle frame having supporting wheels, brake shoes upon which said wheels are adapted to ride, parallel bars normally supporting said shoes in horizontal positions from said vehicle frame in front of the wheels, said parallel bars being positioned one behind the other and one of the bars being mounted upon a yieldably slidable pivot, means for shifting said shoes from said normal positions to positions under the wheels, tension means connecting the forward ends of the shoes to the frame, and shock absorbers in the tension means.

3. In a vehicle brake mechanism of the class described, a vehicle frame having supporting wheels, brake shoes upon which said wheels are adapted to ride, parallel bars normally supporting said shoes in horizontal positions from said vehicle frame in front of the wheels, said parallel bars being positioned one behind the other and the rear bar being mounted upon a yieldably slidable pivot, means for shifting said shoes from said normal positions to positions under the wheels, and tension means connecting the forward ends of the shoes to the frame.

4. In a vehicle brake mechanism of the class described, a vehicle frame having a supporting wheel, a brake shoe upon which said wheel is adapted to ride, bar means normally supporting the shoe in a horizontal position from said vehicle frame in front of the wheel, the bar means comprising a pair of substantially parallel bars positioned one behind the other and connected at their opposite ends to the frame and to the shoe, and yieldable means in connection with the bar means to permit slight tilting of the shoe with respect to the longitudinal extent of the vehicle frame, means for shifting said shoe from said normal position to a position under the wheel, and tension means connecting the forward portion of the shoe to the frame.

5. In a vehicle brake mechanism of the class described, a vehicle frame having a supporting wheel, a brake shoe upon which said wheel is adapted to ride, bar means normally supporting the shoe in a horizontal position from said vehicle frame in front of the wheel, the bar means comprising a pair of substantially parallel bars positioned one behind the other and connected at their opposite ends to the frame and to the shoe, yieldable means in connection with one of the bars to permit slight tilting of the shoe with respect to the longitudinal extent of the vehicle frame, means for shifting said shoe from said normal position to a position under the wheel, and tension means connecting the forward portion of the shoe to the frame.

6. In a vehicle brake mechanism of the class described, a vehicle frame having a supporting wheel, a brake shoe upon which said wheel is adapted to ride, bar means normally supporting the shoe in a horizontal position from said vehicle frame in front of the wheel, the bar means comprising a pair of substantially parallel bars positioned one behind the other and connected at their opposite ends to the frame and to the shoe, resilient means in connection with one of the bars to permit resilient variation of the normal distance between the shoe and the frame at the bar having the resilient means, means for shifting said shoe from said normal position to a position under the wheel, and tension means connecting the forward portion of the shoe to the frame.

7. In a vehicle brake mechanism of the class described, a vehicle frame having a supporting wheel, a brake shoe upon which said wheel is adapted to ride, bar means normally supporting the shoe in a horizontal position from said vehicle frame in front of the wheel, the bar means comprising a pair of substantially parallel bars positioned one behind the other and connected at their opposite ends to the frame and to the shoe, yieldable means in connection with the bar means to permit slight tilting of the shoe with respect to the longitudinal extent of the vehicle frame, means for shifting said shoe from said normal position to a position under the wheel, tension means connecting the forward portion of the shoe to the frame, and a shock absorber in the tension means.

8. In a vehicle brake mechanism of the class described, a vehicle frame having a supporting wheel, a brake shoe upon which said wheel is adapted to ride, bar means normally supporting the shoe in a horizontal position from said vehicle frame in front of the wheel, the bar means comprising a pair of substantially parallel bars positioned one behind the other and connected at their opposite ends to the frame and to the shoe, resilient means in connection with one of the bars to permit resilient variation of the normal distance between the shoe and the frame at the bar having the resilient means, means for shifting said shoe from said normal position to a position under the wheel, tension means connecting the forward portion of the shoe to the frame, and a shock absorber in the tension means.

ANDREW L. CHRISTIANSEN.